(12) United States Patent
Bonforte et al.

(10) Patent No.: US 7,721,217 B2
(45) Date of Patent: May 18, 2010

(54) TEMPLATES FOR THEMED INSTANT MESSAGES

(75) Inventors: Jeffrey Bonforte, San Francisco, CA (US); Patrick Jean, San Francisco, CA (US); Rebecca L. Bochatey, San Francisco, CA (US); Jeffrey Robert Ettenhofer, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 430 days.

(21) Appl. No.: 11/703,896

(22) Filed: Feb. 7, 2007

(65) Prior Publication Data

US 2008/0189620 A1 Aug. 7, 2008

(51) Int. Cl.
G06F 3/00 (2006.01)
G06F 3/14 (2006.01)

(52) U.S. Cl. .................. 715/758; 715/753; 715/765; 715/810; 715/781

(58) Field of Classification Search .................. 715/733, 715/738, 751–753, 758, 205, 235
See application file for complete search history.

(56) References Cited

U.S. PATENT DOCUMENTS

| | | | |
|---|---|---|---|
| 7,028,262 B2 * | 4/2006 | Estrada et al. .............. 715/751 |
| 7,197,715 B1 * | 3/2007 | Valeria ........................ 715/747 |
| 7,503,007 B2 * | 3/2009 | Goodman et al. ............ 715/758 |
| 2003/0009742 A1 * | 1/2003 | Bass et al. ................... 717/104 |
| 2004/0107249 A1 * | 6/2004 | Moser et al. ................ 709/204 |
| 2005/0165726 A1 * | 7/2005 | Kawell et al. ................... 707/1 |
| 2006/0239592 A1 * | 10/2006 | Slatter ........................ 382/305 |
| 2006/0253542 A1 * | 11/2006 | McCausland et al. ....... 709/207 |
| 2007/0038931 A1 * | 2/2007 | Allaire et al. ............... 715/526 |
| 2007/0113181 A1 * | 5/2007 | Blattner et al. .............. 715/706 |
| 2008/0215691 A1 * | 9/2008 | Chhatrapati et al. ......... 709/206 |

* cited by examiner

Primary Examiner—X. L Bautista
(74) Attorney, Agent, or Firm—Hickman Palermo Truong & Becker LLP

(57) ABSTRACT

A method for templates for implementing instant message themes is provided. For example, the user selects between a "to-do" theme, an "invite" theme, a "postcard" theme, a "reminder" theme, etc. If the user selects the "to-do" theme, the to-do template may prompt the user to input a description of the task to be performed and a due date/time. An instant message is sent to a recipient who is to perform the task. The recipient's instant message application displays a to-do in a themed IM window. The themed IM window may have special features that are related to the interactions for the to-do theme. For example, the themed IM window can have a "completed indicator" for the recipient to send a completion notice to the sender. Alternatively, the themed IM window could have a button to perform the task. In response to performing the task, the to-do theme could automatically send a completion notice.

23 Claims, 6 Drawing Sheets

TEMPLATES FOR THEMED INSTANT MESSAGES

FIELD OF THE INVENTION

The present invention relates to instant messaging. In particular, embodiments of the present invention relate to templates that are used for instant messaging based on a theme associated with a particular template.

BACKGROUND

Instant messaging allows two or more users to instantly share messages. Typically, an instant message (IM) application presents a text window for each user to enter a text message to be shared with the other user and a conversation window to display the content of the text messages.

To enrich the communication experience, some IM applications have special features such as "environments," which may alter the appearance of the conversation window. For example, a particular environment might cause the conversation window to display an aquarium with fish swimming. The text of the conversation is then superimposed over the aquarium. A user can share an environment such that each user sees the same environment in the conversation window. However, the environment typically serves as a "background" to the conversation.

Some IM applications have other features such as allowing a user to add an "emoticon" to a text message. For example, a user can select from one of many different types of faces, each expressing a particular emotion. The IM application appends the selected emoticon in the text message.

Some IM applications allow users to play games while engaging in a conversation. For example, two users who are engaged in an IM conversation can play a game of chess, checkers, backgammon, etc. Thus, the users are allowed to comment, in the conversation window, on the moves made by the other game player or discuss any other topic. However, the game playing itself does not allow the users to communicate ideas and messages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
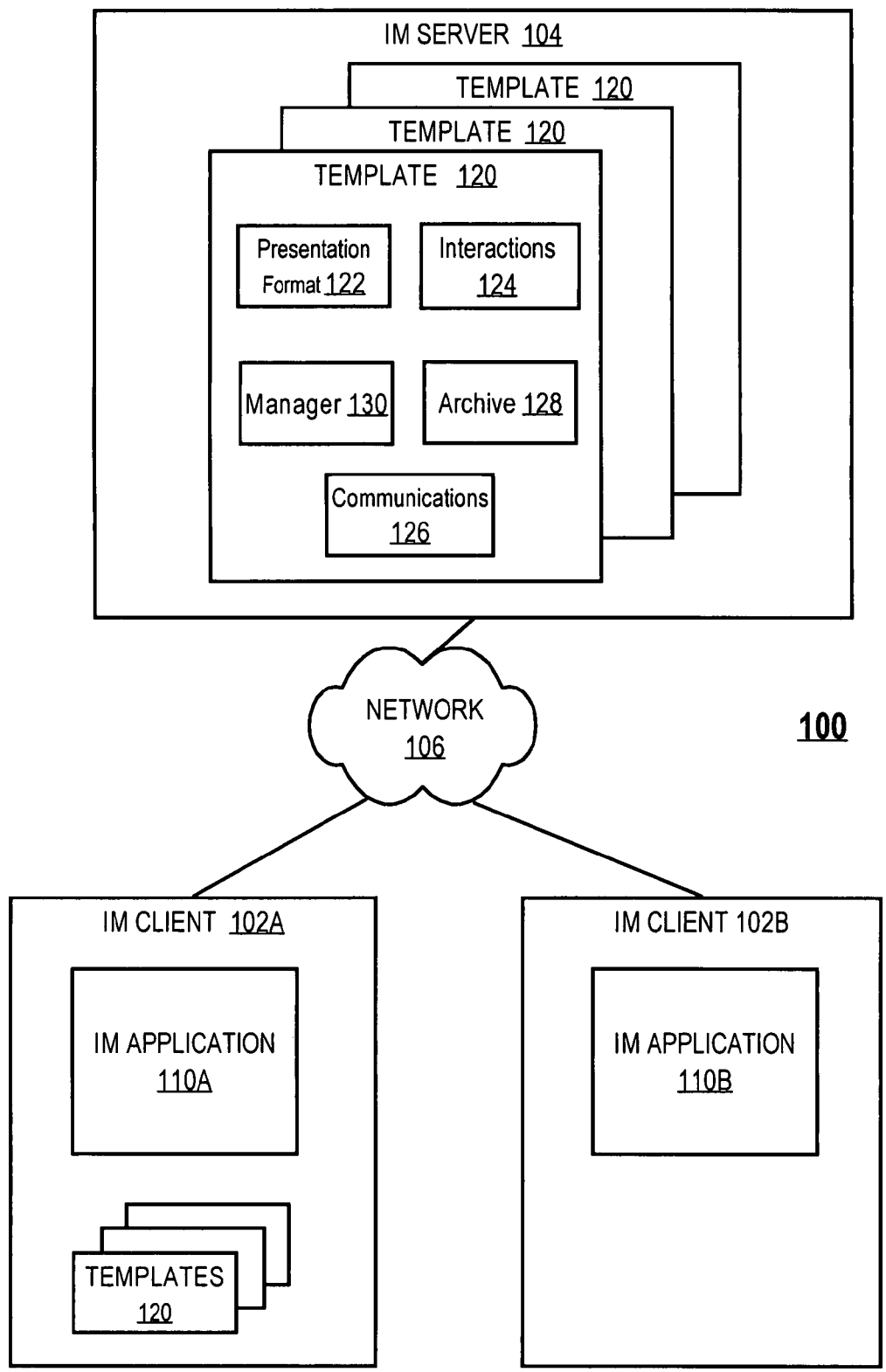
FIG. 1 is a system in which themed IM templates are used to enhance instant messaging, in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Templates for implementing instant message themes are disclosed herein. The templates themselves may comprise a set of software instructions and/or data structures. The templates are capable of a variety of functions relating to the particular theme including, but not limited to, understanding what actions or interactions are possible; displaying a themed IM window; prompting users for input; automatically sending IM messages, other communications, or data; keeping track of information pertaining to interactions; managing the interactions between multiple participants in the particular theme, etc.

The following brief example will illustrate some of the functions of a template. A user of an IM application selects a theme from a group of available themes. For example, the user selects between a "to-do" theme, an "invite" theme, a "postcard" theme, a "reminder" theme, etc. As a particular example, if the user selects the "to-do" theme, a to-do template prompts the user to input a description of a task to be performed and a due date/time for task completion, in one embodiment. The template causes an instant message to be sent to a recipient who is to perform the task. The recipient's device either has or obtains a corresponding to-do template. The recipient's device displays a themed IM window that is specially adapted for to-do instant messages, in this example. The themed IM window may have special features that are related to the interactions for the to-do theme. For example, the themed IM window can have a "completed indicator" for the recipient to send a completion notice to the sender. Alternatively, the themed IM window could have a button to perform the task. More particularity, the themed IM window could have a button that, when selected, automatically places a telephone call in order to complete the task. In response to placing the call, the to-do template could automatically send a completion notice. Many other examples of themes are provided herein.

As another example a template for a "postcard" theme sends a postcard to the recipient. On the sender side, the postcard template might prompt the sender for conversational content. The conversational content might be text or audio. The postcard template might also prompt the sender for "visual" content, which might be a photo or video. The postcard could be an "n-dimensional postcard" meaning that any number of photos could be included.

When the recipient receives the IM from the sender, a postcard template could automatically understand where on the postcard the conversational content and video content should be placed. For example, if the conversational content is text, the postcard template could automatically add the text to the "back side" of the postcard. That is, the postcard could have a feature that allows it to be flipped between a "front side(s)" and a "back side(s)." When viewing the front side, the postcard template could allow the recipient to walk through a slide show of photos. The recipient could view the slide show when engaged in an instant message conversation with the sender, and/or other recipients. However, the slide show could be viewed at any time.

In one embodiment, the templates allow communication in a format that is relevant to the form of communication. For example, in non-electronic communication, the format the sender selects to carry the message is relevant to the type of message. As a particular example, "sticky notes," otherwise referred to as "repositionable notes" are often used for reminders or tasks. As another example, if a sender wishes to invite someone to a wedding or party, the sender might select formal card stock to send the message. The user can select from different themes that are relevant or adapted to different types of communication, wherein a template that is adapted to that theme facilitates all of the interactions for that theme, in one embodiment.

Example System

FIG. 1 shows an example system 100 for themed IMs, in accordance with an embodiment of the present invention. In general, the example system 100 has clients 102a, 102b, and IM server 104, communicatively coupled via a network 106. The network 106 is the Internet in one embodiment, but is not required to be the Internet. Each client 102 has an IM application 110a, 110b. An IM application 110 typically displays a list of contacts, as well as an indication of whether the contacts are currently available to receive an IM. The IM application 110 allows a user to select a contact as an IM recipient, input a text message, and send an IM to the IM recipient. The IM may be sent directly from one IM client 102a to another IM client 102b, or the server 104 may be used to route the IM. An IM client 102 can be any electronic device capable of running an IM application 110 including, but not limited to, a personal computer, cellular telephone, and personal digital assistant (PDA). There may be millions of IM clients 102 in the system 100. However to avoid obscuring the diagram only two are depicted.

At least one of the devices (102a, 102b, 104) in the system 100 has stored thereon one or more templates 120, each of which may be associated with a particular theme. For example, one template 120 might be associated with a "to-do" theme, another with a "postcard" theme, still another with a "postcard" theme. Numerous examples of themes are presented herein for purposes of illustration. However, the present invention is not limited to the example themes presented herein.

A template 120 can be implemented as a set of software instructions and/or data structures. For example, a template 120 might be a plug-in module, which an IM client 102 installs. Alternatively, a template 120 might be an applet that is provided by the server 104 to an IM client 102 for temporary use. Thus, the templates 102 at IM client 102a might be plug-ins, which could have been received from the server 104 at any time and installed in the IM application 110a. Note that IM client 102b does not have any templates 120 at this time. When the IM application 110b at IM client 102b needs a template 120, it may request one from the server 104. The server 104 could then provide IM client 102b an applet or a plug-in. Thus, over time an IM client 102 might build up a greater number of templates 120. However, it is not required that an IM client 102 store the templates 120.

Further, it is also possible that a template 120 is not sent to the IM client 102 at all. For example, the server 104 could have software executing thereon that performs instructions necessary to implement the theme of the selected template 120. If it is necessary for the IM client 102 to display an IM window, or prompt the user for input, the server 104 could, for example, send an HTML document to an IM client 102, which the IM client 102 displays to accomplish these tasks.

For the purpose of explaining various functions that templates 120 are capable of, the following will break down the functions into various logic portions. It will be understood that in actual implementation a single code block might implement multiple ones of the logic portions. A particular template 120 might have logic for presentation format 122, interactions 124, communications 126, archiving 128, and management 130. Each piece of logic is able to implement the theme of the template 120 in accordance with the rules of that theme. For example, the presentation format logic 122 is used to present a themed IM window in accordance with the theme. As a particular example, a "postcard" type of presentation might be used for a postcard theme. FIG. 2B illustrates an example themed IM window.

The interactions logic 124 logic understands all of the actions/interactions that are possible for the particular theme. For example, the interactions logic 124 for a to-do theme understands that there may be a task deadline, wherein the interactions logic 124 automatically generates an alarm based on the deadline. The interactions logic 124 logic may also prompt the user for appropriate input, such as the user's response to a query for a poll theme.

The communications logic 126 handles all communications. For example, the communications logic 126 may automatically send an IM in response to a task being completed for a to-do theme. The communications logic 126 is also capable of transferring data that is not an IM. For example, a template 120 might cause an IM client 102 to send data to the server 104, where the data is processed.

The archive logic 128 stores whatever information is needed to implement the particular theme. For example, the archive logic 128 might store results of a poll for a poll theme. As another example, the archive logic 128 might store pictures from a postcard theme for later viewing.

The manager logic 130 is able to orchestrate interactions between users at different IM clients 102 interacting in accordance with a particular theme. For example, the server 104 receives poll data from IM clients 102, tallies the poll data, and reports the poll results to IM clients 102, in one embodiment.

It is not required that each type of template 120 have all of the aforementioned functionality. For example, a to-do template 120 might have different functions than an invite template 120. Moreover, each type of template 120 can have different versions having different functionally. For example, a version of a template 120 used by an IM client 102 might not have manager logic 130, whereas the version used by the server 104 does. Furthermore, the logic shown in the template 120 is for purposes of illustration; therefore, a template 120 may have other logic not explicitly stated.

Example Themed IM Window

Figure 2A:
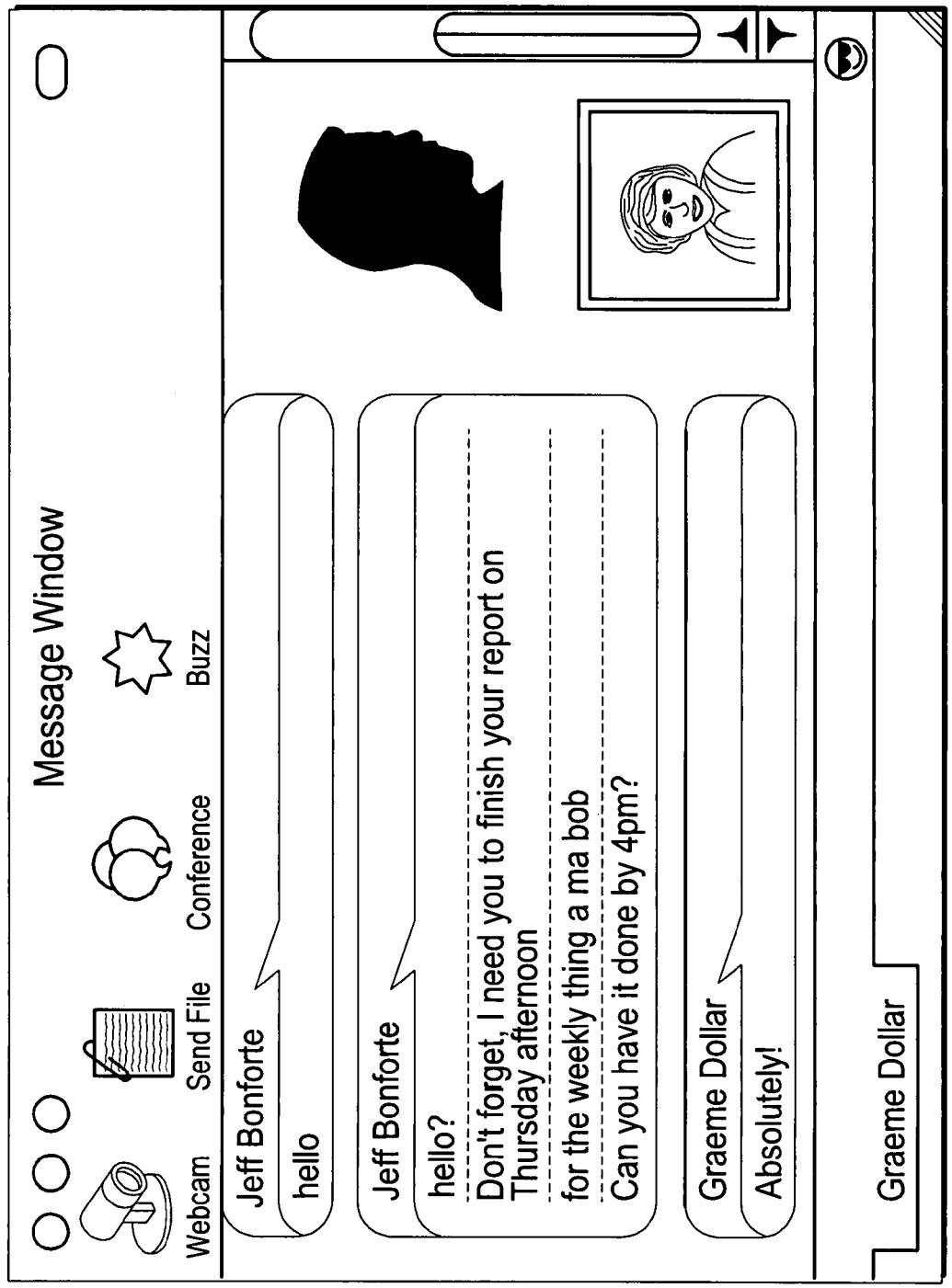
FIG. 2A is a conventional IM conversation window.
Figure 2B:
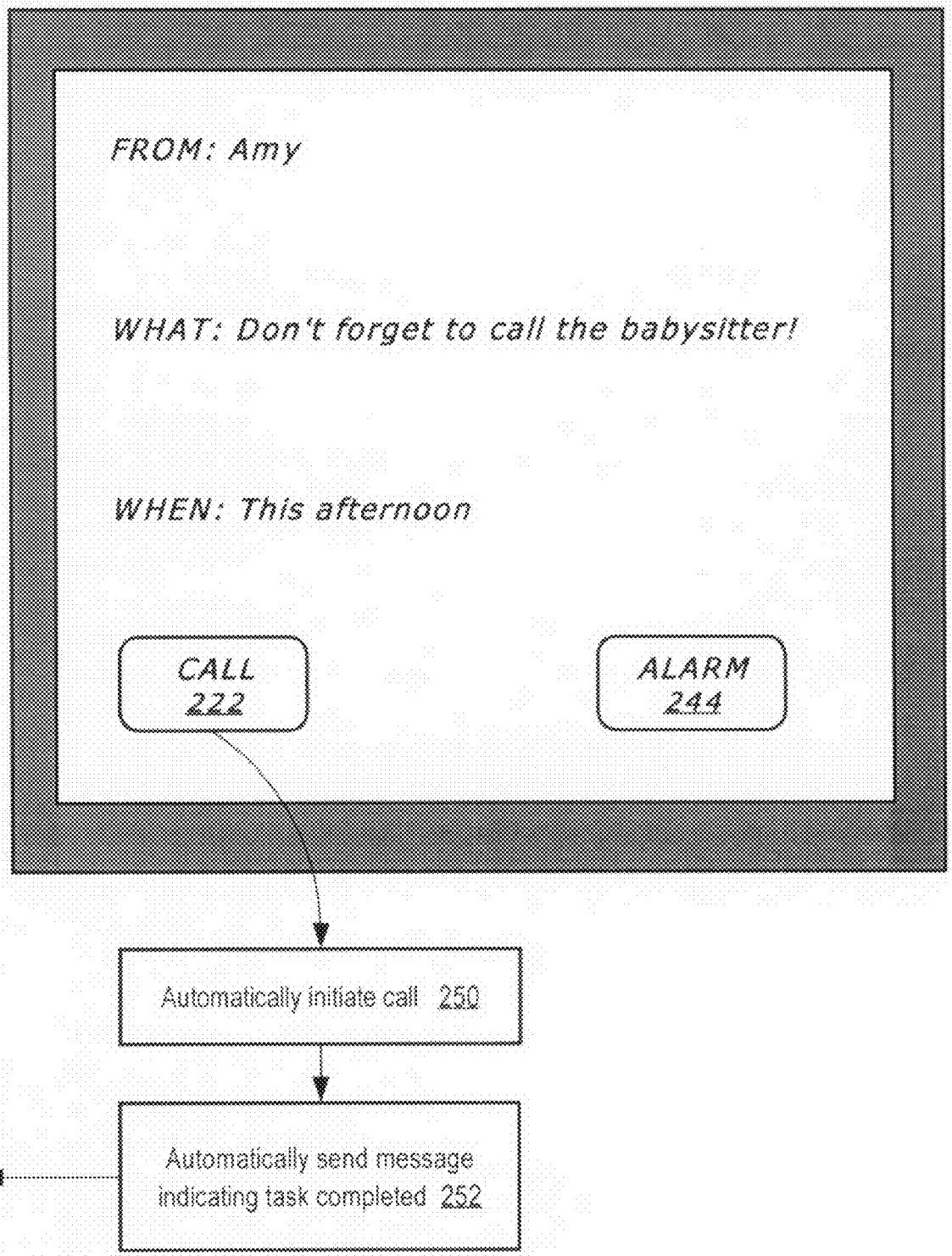
FIG. 2B is an example themed IM window in accordance with an embodiment.

FIG. 2A shows a message window 205 that a conventional instant message application might display. The sender and receiver are able to engage in a live conversation. The sender receives a response from the recipient indicating that the recipient expects to complete the task, which might not actually be completed for several hours. However, unless the recipient takes the trouble to re-establish contact with the sender when the recipient completes the task, the sender will not know when, or if, the task was completed.

FIG. 2B shows an example themed IM window 210 and flow diagram, in accordance with an embodiment of the present invention. The example themed IM window 210 is rendered in accordance with a "to-do" template 120. That is, the to-do template 120 understands that the IM pertains to a to-do theme, and in this example has automatically formatted the themed IM window 210 to simulate a "sticky note," otherwise referred to as a "repositionable note." Thus, the template 120 presents the themed IM window 210 in a familiar format that users might use for non-electronic communication, in this embodiment. The to-do template 120 could format the themed IM window 210 in some other way. In one embodiment, the sender is allowed to input one or more parameters to be used to display the themed IM window 210. For example, the sender might specify the color or shape of the themed IM window 210.

Some of the elements of the themed IM window 210 could be standard for all IM windows in that theme. For example, the "FROM," "WHAT," and "WHEN" fields could be standard for a to-do theme. However, the call button 222 could be optional in that it would only apply if a telephone call was to be made as a part of the to-do task.

Note that the template 120 allows for additional interactions that are not possible with the message window 205 of FIG. 2A. For example, the "to-do" template 120 can have an alarm 244 or timer associated with it to remind the recipient of the task. Furthermore, the to-do template 120 can automatically send a "completed" indication to the first user when the second user completes the task. For example, when the user selects the call button 222, the template 120 automatically initiates a telephone call, in step 250. In step 252, the template causes a message to be sent to the first user. The message may or may not be an IM.

Furthermore, because the template 120 understands the rules associated with this particular theme, the template 120 itself can guide the users through the input process by prompting the users for input. For example, the first user can be prompted to input information that can be used to fill in various fields of the themed IM window. The template 120 can obtain some information automatically, without user input. For example, the sender's name can be obtained without user input. However, the nature of the task and a completion deadline can be provided by user input.

Process Overview

Figure 3:
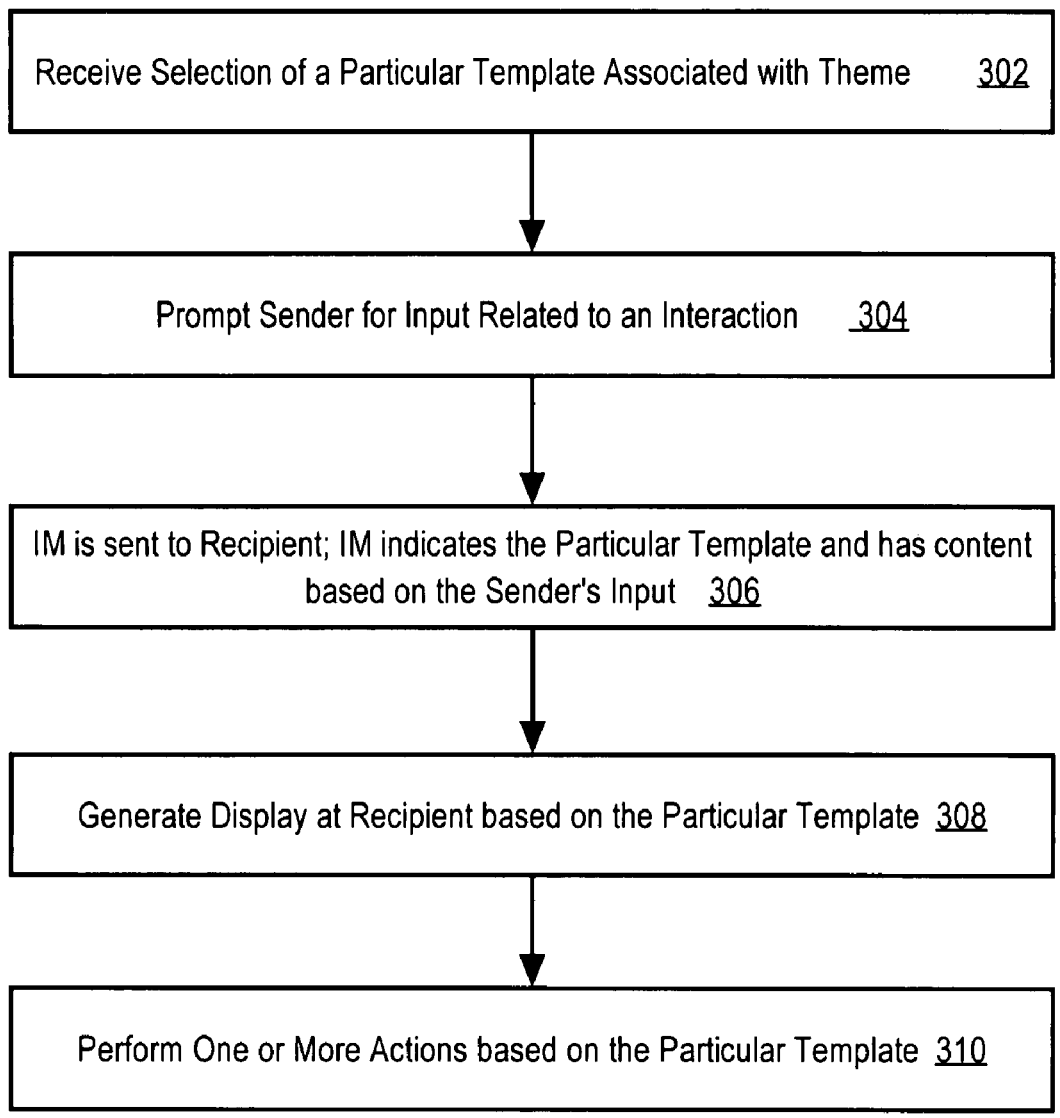
FIG. 3 is an overview of a process of using themed IM templates for instant messaging, in accordance with an embodiment.

FIG. 3 is a flowchart illustrating a process 300 of instant messaging using templates 120, in accordance with an embodiment. Process 300 uses an example in which the template 120 pertains to a to-do theme. However, there are many possible variations to process 300 when the template 120 pertains to a different theme. Further, process 300 refers to various elements of system 100 of FIG. 1 and the example themed IM window 210 of FIG. 2; however, process 300 is not limited to system 100 nor to example themed IM window 210.

In step 302, a first IM client 102a receives user input from a user who is to send an IM. In particular, a sender selects a particular template 120 of available templates 120. For example, the sender selects a "to-do" template 120. The template 120 need not be currently stored on the IM client 102a at the time of selection. If the template 120 is not stored at the IM client 102a, then the server 104 may send an applet for temporary use or a plug-in to be installed at IM client 102a. It is also possible that the template 120 is not sent to the IM client 102a at all. For example, the server 104 could have software executing thereon that performs instructions necessary to implement the theme of the selected template 120. For example, the server 104 can prompt the IM client 102a for whatever input is needed and instruct the IM client 102a to display whatever images are needed.

In step 304, the sender is prompted for input for an interaction from a specific set of interactions that are associated with the selected template 120. The instant message application 102a at the first IM client 102a prompts the sender, in one embodiment. In another embodiment, the server 104 prompts the sender. As an example, the interactions for the to-do template 120 can include the sender entering a task that the sender wants to be performed by a recipient and by when the sender wants the task completed.

In step 306, a message is sent from the first IM client 102a to the second IM client 102b. The message might be sent directly from the first IM client 102a to the second IM client 102b or via the server 104. The message indicates the selected template 120 and includes content that is based on the input from the sender. For example, the message indicates that this is a to-do template 120 and includes content the sender entered in response to the "what" and "when" prompts. Note that the user does not necessarily initiate the sending of the IM message. For example, the template can automatically send the IM based on some user action/interaction.

In step 308, the second IM client 102b generates a display that displays the content in a manner associated with the theme, based on the selected template 120. For example, the second IM client 102b displays the themed IM window 210 of FIG. 2. When the second IM client 102b receives the IM, the IM application 110b determines whether it knows how to process the IM in view of the selected template 120. If the second IM client 102b does not have the selected template 102 it may request it from the server 104. Alternatively, the server 104 can perform processing necessary to implement the template 120, such as providing the second IM client 102b with the necessary data to display. For example, the server 104 could send the second IM client 102b an HTML page to be displayed to implement the themed IM window 210. Thus, it is not required that the second IM client 102 have a version of the template 120 thereon.

In step 310, one or more additional actions are taken based on the particular theme. The additional actions could be a wide variety of actions, depending on the theme. Using the to-do theme as an example, the additional actions could include the second IM client 102b sending a message to the first IM client 102a in response to the recipient completing the task. The to-do template 120 might determine that the task is completed based on an affirmation from the recipient that the task has been completed, or by detecting that the recipient completed the task. For example, if the task is to make a telephone call, the recipient might click on a button to affirm that the call has been completed. Alternatively, the to-do template 120 might detect that the telephone call was made. This might be the case if the second IM client 102b is a cellular telephone.

As previously stated, process 300 provides a general process overview, using a specific example in which the template 120 is a to-do theme. Many variations of process 300 are possible.

Communicating Between Templates

Some templates 120 have the ability to communicate with each other. Thus, a template 120 can have an awareness of what other templates 120 are in existence that might be pertinent to that particular template 120. Furthermore, a template 120 can be aware of a property that another template 120 currently possesses. An example of a property is a "role." For example, a template 120 on IM client 102*b* is aware that a template 120 on IM client 102*a* is playing a "task initiator" role; and the template 120 on IM client 102*a* is aware that the template 120 on IM client 102*b* is playing a "task recipient" role. The ability to be aware of other templates 120 and their properties, as well as to communicate with other templates 120 allows a theme to allow a group of individuals to collaborate and share the results of the collaboration. The following two example themes of a "poll" and an "invitation" will serve to illustrate.

A template 120 for a "poll" theme allows a group to collaborate on a poll. At the IM client 102 of the sender, the poll template 120 might prompt the sender to input the poll question. The poll template 120 might also prompt the sender for formatting information for how the poll results should be displayed. On the recipients' IM client 102, the poll template 120 might display a graph depicting the results in real-time. To display the graph, the poll template 120 would prompt each poll recipient for their response to the poll question(s) and sends the responses to the server 104. The server 104 totals the responses and distributes the totals to each of the IM clients 102.

Figure 4:
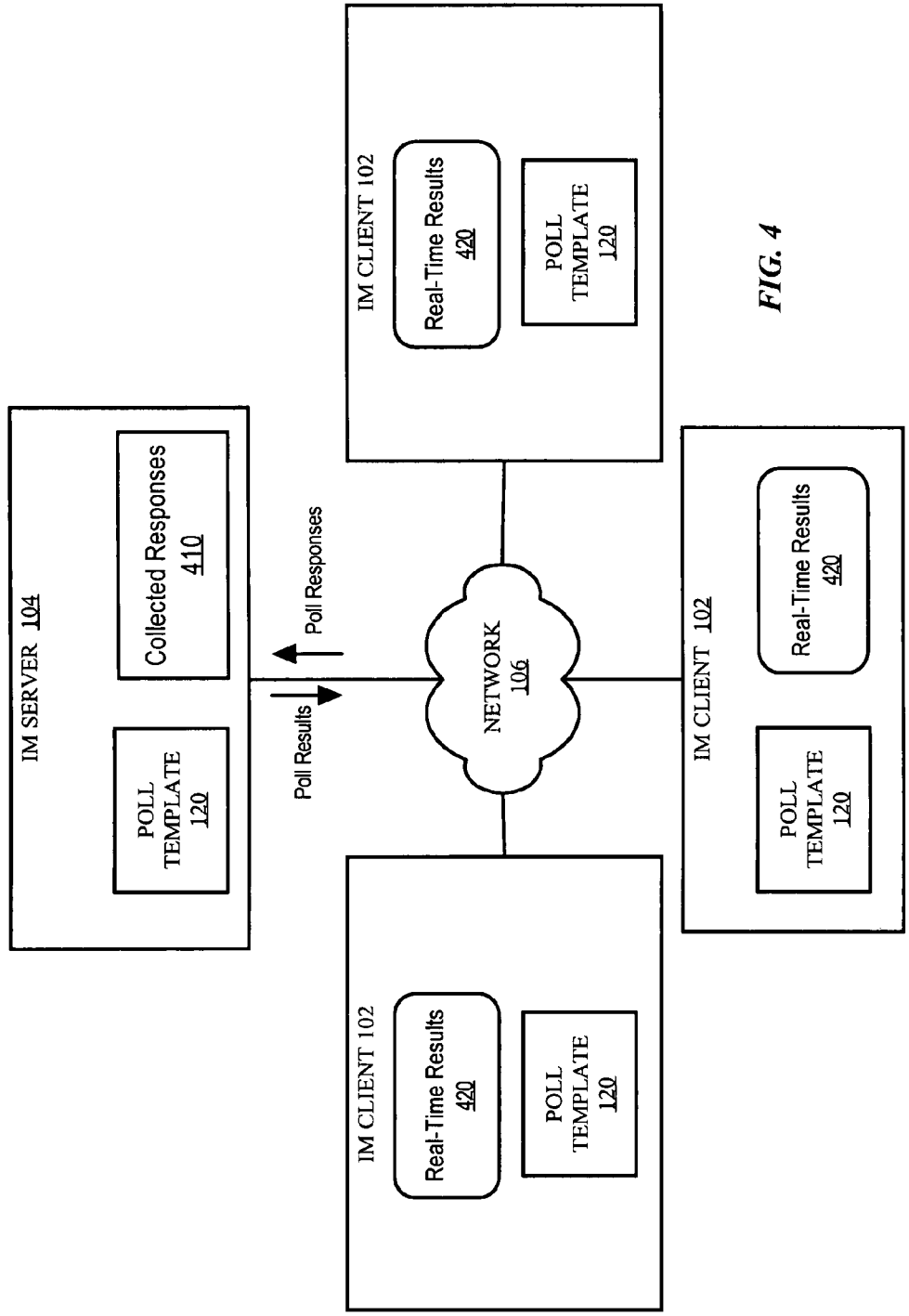
FIG. 4 is a system in which themed IM templates and a central manager are used to enhance instant messaging, in accordance with an embodiment.

FIG. 4 depicts an example system 400 is which the IM clients 102 send information to the server 104, which in this example are poll responses. More generally, the IM clients 102 could send any data to the server 104. The server 104 collects the information and processes it in accordance with rules (e.g., software instructions) in the template 120. In this example, the server 104 totals the poll results. The server 104 then sends data to the IM clients 102, in accordance with the template 120. The poll theme also illustrates an example in which one node functions as a central manager. The central manager could be the server 104; however, any of the IM clients 102 could also serve as the central manager.

An "invite" theme allows the sending of an invitation to an event. At the sender's IM client 102, the invite template 120 could prompt the sender for content describing the nature of the event, such as time, location, and description. The invite template 120 might also prompt for additional information such as maps, photos, and web links.

At the recipient's IM client 102, the invite template 120 could automatically display the content describing the event, as well as a "button" to accept or decline the invitation. The invite template 120 might also display a map showing the location of the event, directions from the recipient to the event, photos related to the event, web links related to the event etc. In response to a recipient either accepting or declining the invitation, the invite template 120 would automatically send a message to the sender of the invitation. The message could be sent by any communication medium including, but not limited to, instant message, e-mail, and telephone. For example, the message could be sent via instant message, wherein an invite template 120 at the sender IM client would track which invitees have accepted and which have declined.

The invite theme can use the server 104 as a central manager. For example, when an invitee make their selection, the response can be sent to the server 104, which tracks responses, and sends current responses to each invitee, as well as the inviter.

Persistence of Templates and their Data

A template 120 may stay in existence after the IM session in which the template 120 was received has ended. A template 120 stays in existence until an event or combination of events has occurred, in one embodiment. For example, the to-do template 120 can stay in existence until the task has been completed. If the user shuts down their device, the template 120 is automatically re-awakened when the device is re-booted, in one embodiment. The template 120, or its associated data, could remain on the IM client until the user takes an affirmative action to delete the template 120 or associated data.

Some templates 120 have the ability to archive information. The archived information can be used after the IM session in which the template 120 was received has ended. For example, a template 120 for a "bookmark" theme sends a link to a recipient. At the sender's IM client 102, the bookmark template 120 could prompt the sender for the link in a number of different ways. The bookmark template 120 can also send a thumbnail of the bookmarked web page, additional information about the bookmarked web page, and links to similar web pages. A template 120 for a "video" theme allows videos to be sent and commented on. A template 120 for a "music" theme allows the recipient to continue to play a music file after the IM session has ended.

A template 120 for a "preferences" theme allows the sender to send preferences or settings associated with a software application to a recipient. The preferences template 120 on the recipient's IM client 102 can archive the preferences formerly in use by the recipient such that the recipient's preferences can be restored.

Clearly, a template 120 is not limited to one of the particular logic functions described herein. For example, the recipient's preferences template 120 can also communicate with the sender's preferences template 120. The recipient's preferences template 120 might report back to the sender's IM client 102 to inform the sender whether or not the recipient is using the preferences.

Group Collaboration

As previously mentioned, a template 120 can allow a group of IM users to collaborate. The following examples will be used to illustrate. A template 120 for a "question" theme allows the sender to initiate a question that the recipients can choose to answer. Each recipient is allowed to see the other's answers as they are provided such that they may comment of the answers, or come up with new answers. The server 104, or another node, can act as a central manager.

A template 120 for a "registry" theme allows a list to be developed and shared by a group of individuals. This list might be items that someone wishes to have given to them as a gift, for example. The group members can then manipulate items on the list in some way. For example, a group member might check off an item that the member purchased. Group members might also add additional items to the list or modify a description of an item. Thus, the list might be created by a single user (e.g., a wish list) or by the members as a group activity.

Hardware Overview

Figure 5:
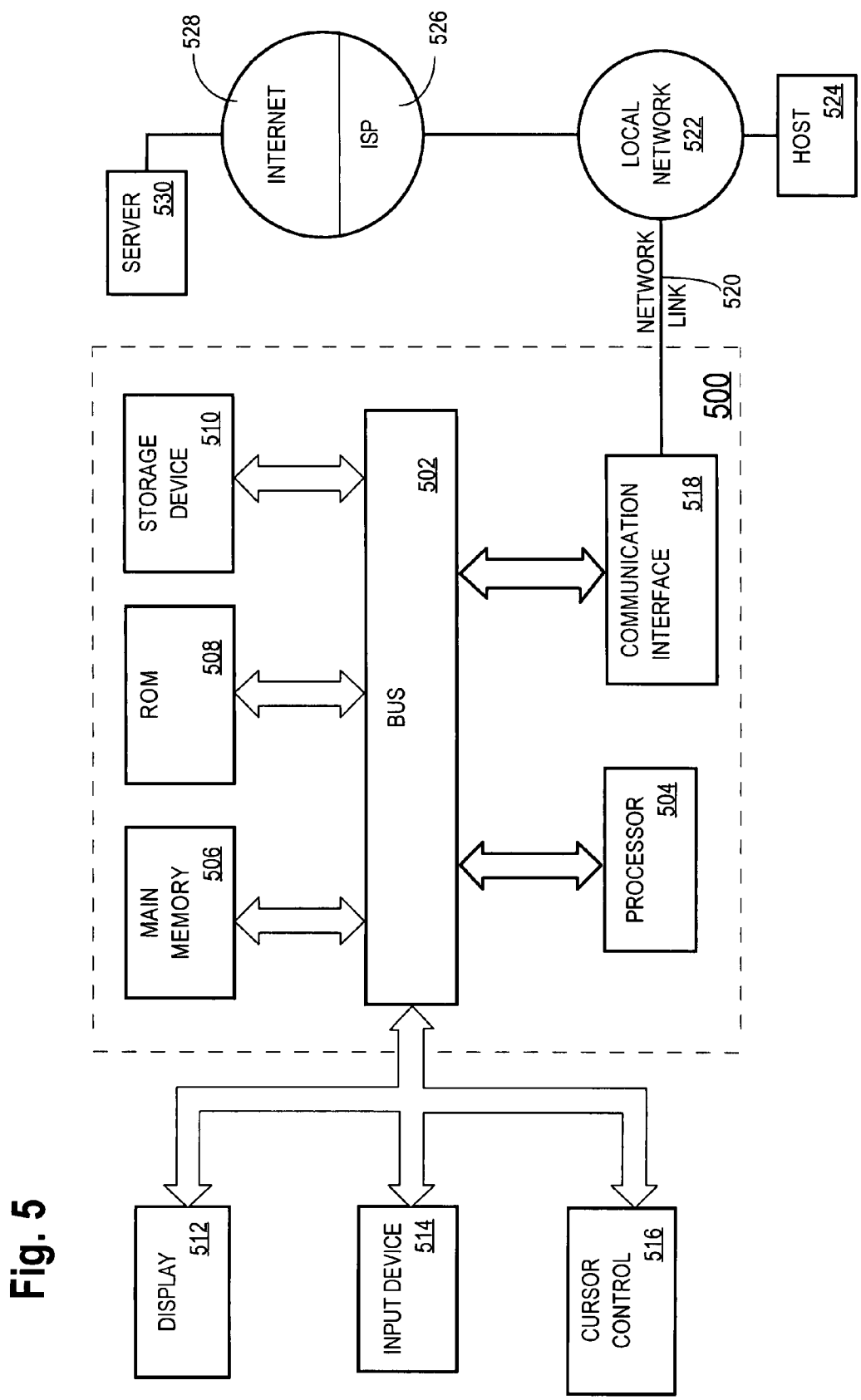
FIG. 5 is a computer system upon which embodiments of the present invention may be practiced.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
   storing a plurality of templates, wherein each template
      a) defines a set of fields and a manner of presenting user-provided information for those fields;
      b) is based on a theme; and
      c) defines functionality associated with the theme;
   receiving, at a first IM client, first user input from a first user, wherein the first user input selects a particular template of the plurality of templates;
   in response to the first user input, prompting the first user for second user input for the set of fields associated with the particular template;
   sending, from the first IM client to a second IM client of a second user, a message that indicates the particular template and includes content that is based on the second user input;
   wherein receipt of said message at the second IM client automatically causes the second IM client to:
      generate a display that displays the content in the manner dictated by the particular template; and
      provide the functionality that is defined in the particular template for the theme;
   wherein the method is performed by one or more computing devices.

2. The method of claim 1, further comprising, based on the particular template, prompting the second user for third user input which customizes the functionality of the particular template.

3. The method of claim 1, further comprising causing the second IM client to generate an interface in a manner dictated by the functionality of the particular template.

4. The method of claim 1, further comprising transmitting a response from the second user at the second IM client to the first IM client in the manner dictated by the particular template.

5. The method of claim 1, wherein the message is sent from the first IM client to the second IM client as part of a session between the first IM client and the second IM client, the method further comprising saving the content of the message, sent from the first IM client to the second IM client, local to the second IM client such that the content of the message continues to be available to the second user of the second IM client after IM session has ended between the first IM client and the second IM client.

6. The method of claim 1, further comprising automatically transferring data from the second IM client to a server in the manner dictated by the particular template.

7. The method of claim 6, further comprising:
   processing the data, along with data received at the server from other IM clients to generate results in the manner dictated by the particular template; and
   transmitting the results to the first IM client, the second IM client, and the other IM clients.

8. The method of claim 1, wherein storing the plurality of templates comprises storing the templates on the first instant message client.

9. The method of claim 1, wherein the plurality of templates are stored on a third party server and further comprising transferring the particular template to the first IM client in response to the first user selecting the particular template.

10. The method of claim 1, wherein the plurality of templates are stored on a third party server and further comprising transferring the particular template to the second IM client after the message that indicates the particular template is received by the second IM client.

11. The method of claim 1, wherein sending the message comprises sending the message directly from the first IM client to the second IM client.

12. The method of claim 1, wherein sending the message comprises sending the message from the first IM client to a server and the server forwarding the message to the second IM client.

13. The method of claim 1, wherein the particular template is a to-do template, and wherein prompting the first user for second user input comprises prompting the first user to input a description of a task to perform; and
   further comprising, in response to the second user completing the task, the second IM client sending a message to the first IM client indicating that the second user has completed the task.

14. The method of claim 1, wherein the particular template is an invitation template, and wherein prompting the first user for second user input comprises prompting the first user to input a description of an event;
   wherein receipt of said message at the second IM client causes the second IM client to generate a display that displays the content comprising prompting the second user to accept or decline the invitation; and
   further comprising, in response to the second user accepting or declining the invitation, the second IM client sending a message to the first IM client indicating whether the second user has accepted or declined the invitation.

15. The method of claim 1, wherein the content comprises a textual message received from the second user input.

16. The method of claim 1, wherein the content comprises an audio message received from the second user input.

17. A computer program product embodied in volatile or non-volatile storage, said program when executed on one or more processors operable to:
   receive, at a first instant message (IM) client, first user input from a first user, wherein the first user input selects a particular template of a plurality of templates;
   wherein each template of the plurality of templates
      a) defines a set of fields and a manner of presenting user-provided information for those fields;
      b) is based on a theme; and
      c) defines functionality associated with the theme;
   in response to the first user input, prompt the first user for second user input for the set of fields associated with the particular template;
   send, from the first IM client to a second IM client of a second user, a message that indicates the particular template and includes content that is based on the second user input;
   wherein receipt of said message at the second IM client automatically causes the second IM client to:
      generate a display that displays the content in the manner dictated by the particular template; and
      provide the functionality that is defined in the particular template for the theme.

18. The computer program product of claim 17, wherein when executed on the one or more processors is further operable to, based on the particular template, prompt the second user for third user input which customizes the functionality of the particular template.

19. The computer program product of claim 17, wherein when executed on the one or more processors is further operable to cause the second IM client to generate an interface in a manner dictated by the functionality of the particular template.

20. The computer program product of claim 17, wherein when executed on the one or more processors is further operable to transmit a response from the second user at the second IM client to the first IM client in a manner dictated by the particular template.

21. The computer program product of claim 17, wherein the message is sent from the first IM client to the second IM client as part of a session between the first IM client and the second IM client, and wherein when executed on the one or more processors, the computer program product is further operable to save the content of the message, sent from the first IM client to the second IM client, local to the second IM client such that the content of the message continues to be available to the second user of the second IM client after the IM session has ended between the first IM client and the second IM client.

22. The computer program product of claim 17 wherein when executed on the one or more processors is further operable to automatically transfer data from the second IM client to a server in a manner dictated by the particular template.

23. The computer program product of claim 22, wherein when executed on the one or more processors is further operable to:

process the data, along with data received at the server from other IM clients to generate results in a manner dictated by the particular template; and transmit the results to the first IM client, the second IM client, and the other IM clients.

* * * * *